Patented Oct. 20, 1925.

1,557,917

UNITED STATES PATENT OFFICE.

BERNARD H. ZIEHLER, OF DAYTON, OHIO.

BEVERAGE EXTRACT.

No Drawing.   Application filed October 26, 1920.   Serial No. 419,615.

*To all whom it may concern:*

Be it known that I, BERNARD H. ZIEHLER, a citizen of the United States, residing at Dayton, in the county of Montgomery and State of Ohio, have invented certain new and useful Improvements in Beverage Extracts, of which the following is a specification.

This invention relates to a beverage and more particularly to the preparation of extractive solid matter of comminutive or granular or powdered form to form the foundation or active agent of a beverage.

The object of the invention is to afford a soluble extract of a malted cereal and hops with or without the addition of either or both, a saccharine body and an unmalted cereal, a solution of which affords a palatable beverage of healthful and nutritious character and inviting taste, color and general appearance.

Transfusions of baked legumes, cereals, nuts and fruits and of various herbs, barks and roots formed by steeping or percolating the basic materials, have been used heretofore for beverage purposes. The preparation of such transfusions, however, requires considerable time and skillful attention and is not suitable for quick service either in the home or in hotels, restaurants or at soda fountains and other dispensaries.

The present invention contemplates the formation of a solid soluble extract of several hereafter described materials combined and blended in measured proportions and prepared according to a definite and established process herein described, whereby the beverage may be subsequently prepared by unskilled persons by quickly dissolving the comminuted extracted matter in water to which may or may not be added other ingredients according to taste.

By preparing the extractive matter under skilled management with due attention to the details of the process, the taste, appearance, flavor and tonical value of the beverage solution is insured, as well as a material reduction in the period of time necessary in preparing the beverage for serving.

While the invention is capable of being embodied in various compounding and treatment of different materials, the preferred process and materials being hereafter described, it is to be understood that the specific references, and amounts of materials are for illustrative purposes and are not intended to be construed as limitations except within the valid and legitimate scope of the appended claims.

In preparing the extractive matter, a quantity of hops is boiled in water, preferably in the approximate proportions of three ounces of dried hops in one and a half gallons of water. Such boiling is continued until the essence of the hops is extracted, which will require approximately thirty minutes of cooking. The hop extract is then strained. A malted cereal, such as wheat, rye, corn or rice, but preferably barley malt is then steeped in the hot hop extract. The desirable proportions are approximately two and a half pounds of dry ground malted cereal to one and a half gallons of hop water, which mixture is steeped for approximately thirty minutes and then strained. The malted cereal (preferably barley) may be roasted to a greater or less degree before steeping to further dextrinize the starch, but such roasting of the malted cereal is not essential. The roasting of the malt will, however, modify the flavor and color of the ultimate beverage, giving it a stronger flavor by the caramelizing of the malt sugar and a distinctive darkened color. In lieu of steeping the malt, the essence of the malt and hops may be extracted by boiling or by percolation which will afford a clear solution without the necessity of filtration. Sugar or other saccharine material may be added at this stage of the process if it be desired that a standard or fixed quantity of sugar be contained in the finished soluble extract. The sugar may, however, be omitted from the extracted matter and subsequently added to the ultimate beverage solution according to desire or taste, or the sugar content of the malt alone may be relied upon.

If sugar is to be contained in the solid extractive matter, then approximately one or one and a half pounds of sugar is dissolved in the strained solution prepared as before described.

Further nutrition may be added or the character of the resultant product may be modified by cooking in the strained liquid before described a small quantity of unmalted ground cereal such as corn or rice. This is preferably done before adding the sugar if sugar is to be used. As before stated, added sugar is not essential in the dried solid extracted material which will contain some malt sugar, and may be wholly omitted.

The aqueous extract of the malt and hops either with or without either or both added sugar and unmalted cereal is then concentrated or condensed by evaporation or further boiling, or by other process of reduction, preferably though not necessarily in vacuo with provisions to prevent loss of volatile matter other than water. It is thus reduced to a semisolid mass or deposit, which contains the essential elements of the malt and hops together with sugar if such has been added. This mass is then dried, preferably though not necessarily in a vacuum chamber, and then ground or pulverized into granular or powdered form. The proportions heretofore stated should afford approximately thirty-two ounces by volume of the completed solid soluble extract, when containing sugar in the proportion stated.

If desired the product may be compressed into tablets of measured proportion to facilitate the preparation of beverages of predetermined strength. The resulting product is an extremely soluble solid extract containing the essence of malted cereal and hops which when dissolved in hot or cold water will produce a highly nutritious beverage, of pleasing flavor and possessing a tonic effect. For use this product when redissolved in the proportion of one part of the extracted material to twenty to twenty-five parts of water will afford a beverage of desirable strength, which may be varied in strength and character by use of more or less water. The dry extract varies in shades of color but is characteristically of a light brown or golden color, and the resulting beverage varies from a light straw color to a dark translucent brown, the prevailing color being a transparent reddish brown.

It is really immaterial whether the malt be steeped in the extract of hops or the extraction of the hops be made by cooking in malt extract. As a further alternative, each extraction may be made separately and the liquid extracted subsequently combined, or each liquid may be separately solidified and the soluble solidified product of each ingredient subsequently intermixed in the desired proportion. The ultimate result and product in either instance being the same.

Pre-roasted malt or pre-roasted hops or both may be utilized to afford desirable variations of flavor, or such flavor may be modified by raising the temperature during the evaporation and so partially cooking the materials. However, the preferred modification is to subject the solidified product to a high temperature by which the materials will be partially carbonized and the sugar content partially caramelized after being reduced from a liquid to a solid form.

Having thus described my invention, I claim:

1. The herein described process of preparing solidified extract for beverage purposes comprising making a fluid extract of the soluble portions of a malted vegetable product and subsequently heating the extracted matter to partially carbonize and caramelize such extractive material.

2. The herein described process of preparing solidified extract for beverage purposes comprising making a fluid extract of the soluble portions of a vegetable product, reducing the extract to solidified form and subjecting the solidified product to heat to effect caramelization.

In testimony whereof, I have hereunto set my hand this 20th day of October A. D. 1920.

BERNARD H. ZIEHLER.